United States Patent [19]
Margalit et al.

[11] Patent Number: 5,305,334
[45] Date of Patent: Apr. 19, 1994

[54] PULSED SOLID STATE RING LASER INJECTION LOCKING STABILIZER

[75] Inventors: Eli Margalit, Calabasas; Farzin Amzajerdian, Thousand Oaks, both of Calif.

[73] Assignee: Litton Systems, Inc., Beverly Hills, Calif.

[21] Appl. No.: 990,993

[22] Filed: Dec. 16, 1992

[51] Int. Cl.⁵ .............................................. H01S 3/13
[52] U.S. Cl. ...................................... 372/32; 372/94;
372/29; 372/28; 372/15; 372/12; 372/10;
356/350
[58] Field of Search .................. 372/32, 94, 29, 28,
372/15, 12, 10; 356/350

[56] References Cited

U.S. PATENT DOCUMENTS

| | | | |
|---|---|---|---|
| 4,752,931 | 6/1988 | Dutcher et al. | 372/18 |
| 5,022,033 | 6/1991 | Hackell | 372/25 |
| 5,027,360 | 6/1991 | Nabors et al. | 372/18 |
| 5,099,486 | 3/1992 | Acharekar et al. | 372/32 |

OTHER PUBLICATIONS

Lachambre et al, "Injection Locking and Mode Selection in TEA-CO₂ Laser Oscillators", IEEE J. Quantum Electronics, QE-12, pp. 756-764 (Dec. 1976).
Menzies, et al, "Atmospheric Aerosol Backscatter Measurements Using a Tunable Coherent CO₂ Lidar", Applied Optics Article, Aug. 1, 1984, vol. 23, No. 15, pp. 2510-2517.

Primary Examiner—Georgia Y. Epps
Attorney, Agent, or Firm—Edmund W. Rusche

[57] ABSTRACT

An injection seeded, single frequency ring laser source is presented wherein stabilization and single frequency control is accomplished by measuring the intensity or power of the portion of the high power laser beam generated in the ring slave laser and which is directed to return to the seed laser. When the intensity of the return beam falls below a preset threshold level, the in-phase operation of the laser system has been established and high energy single frequency pulses are generated and emitted.

14 Claims, 2 Drawing Sheets

PULSED SOLID STATE RING LASER INJECTION LOCKING STABILIZER

FIELD OF THE INVENTION

This invention relates to an injection-seeded stabilized laser source for use in interferometric or heterodyne detection systems wherein the ring slave oscillator provides a powerful output pulse of optical energy at a single frequency suitable for laser radar applications.

BACKGROUND OF THE INVENTION

Doppler laser radar systems operating in heterodyne detection mode are used for remote measurements of atmospheric winds. In order to be used within a laser radar system, the laser must provide a powerful pulse of optical energy at a very narrow bandwidth (single longitudinal and transverse mode). Such a narrow line is achieved utilizing two laser components in an injection-seeding master oscillator/power-amplifier system. Generally, in such a system the master oscillator or seed laser is a low power highly stable, continuous wave laser while the power amplifier or slave laser is a high power pulsed laser operating at a single frequency established by the seed laser.

Utilizing a ring resonator configuration for the slave oscillator provides important advantages such as: a traveling wave (eliminating "spatial hole burning"); a long resonator within a compact frame; and direct and simple laser seeding. Active control of the ring resonator length is essential for single frequency operation of the laser. U.S. Pat. No. 5,099,486 presents a ring laser resonator invention with a type of resonant path length control which, although independent of the invention presented herein, may be utilized in combination with the present invention to improve path length control.

It is an object of this invention to present a method and apparatus for providing a high power, high repetition rate, single frequency laser source.

It is another object of this invention to present a new method and apparatus for providing injection-seeding feedback control for ring slave lasers for use in such laser sources.

It is another object of the present invention to provide an active injection seeding stabilizer for ring slave lasers for use in such laser sources.

It is a further objective of this invention to provide an actively stabilized injection seeded ring laser system.

SUMMARY OF THE INVENTION

This invention presents a novel laser source with a technique for stabilization of an injection seeded ring laser that enhances its use in interferometric or heterodyne detection modes. The laser emits single frequency pulses of high power with high repetition rate capability.

The fundamental embodiment of the invention includes a stable single frequency. continuous wave master oscillator coupled to a higher power ring slave oscillator through an optical isolator. The slave oscillator is activated to generate single mode pulses of energy at the master oscillator single frequency which is controllable within the slave oscillator ring resonant cavity by one or more adjustable corner mirrors.

The single frequency operation of the slave laser is achieved via active longitudinal mode selection performed by a feedback resonator length control. The slave laser within the ring resonant cavity of the slave oscillator normally allows bi-directional flow of the laser beam around the ring resonant cavity. However, when tuned correctly, the injection seeding of the single frequency master oscillator forces the slave laser to mainly lase unidirectionally in the direction of the seed beam.

Tuning the slave laser ring resonant cavity is accomplished by adjusting the total pathlength of the ring cavity to equal an integral multiple of the wavelength emitted by the master oscillator. This ring resonator length control is enable by monitoring the return beam output (in the opposite direction from the master oscillator beam path) from the slave oscillator back to the optical isolator located between the master and slave oscillators. This return beam is diverted by the optical isolator to be monitored by a detector. The measured pulse power and build-up time is then fed to a controller which controls the position of a controllable mounted corner mirror which adjusts the ring resonator pathlength. Once resonant injection-seeding is achieved by the active control of the corner mirror, the pulse energy in the return beam substantially decreases.

The change in intensity between the return beam with the resonant cavity out-of-phase with the master oscillator signal and in-phase with that signal is significant. The out-of-phase return signal intensity is generally several times greater than when in-phase. This allows for the controller to be set to simply detect a drop in intensity to below some preselected threshold value as indicative that proper phasing has occurred. At this point the controller control can be paused, and reactivated later if the resonant condition is lost.

If the resonant condition is later lost, it may be reacquired by programming the controller to search again for resonance by any of a myriad search techniques known in the art, e.g., using some form of sawtooth scan. An alternate and complimentary means of regaining resonance is to utilize the method taught by Achareker et al in U.S. Pat. No. 5,099,486 by hunting for time difference minimization between the time of turn-on for the Q-switch of the slave oscillator and the time of occurrence of the pulse output from the slave laser in the forward direction for rough determination of the mirror adjustment for resonance, and then to transfer to the technique taught herein for fine adjustment and control.

DESCRIPTION OF THE PREFERRED EMBODIMENT

This invention presents a novel technique and apparatus of adjusting a slave laser to emit high energy pulses at a single frequency set by a reference seed laser. The invention comprises a seed laser resonator serving as a master oscillator; a ring laser resonator serving as a slave laser connected to said seed laser, and having a closed path for its laser beam; means for changing said closed pathlength of said ring laser resonator; means, serving as part of said ring laser resonator, for switching into and out of resonance said ring laser resonator whereby said high energy output pulses are created; means for detecting a return laser beam emitted from said slave laser back toward said seed laser resonator; and means for comparing the intensity of said return laser beam with a predetermined threshold level and for causing said means for changing to adjust said closed pathlength of said ring laser resonator by a predetermined amount before a next single output laser pulse is created in a manner preset to be responsive to said compared intensity and said threshold level.

The ring laser resonator further comprises a plurality of mirrors for guiding a laser beam along said closed path, a slave laser rod of a preselected material for generating the high energy pulses and a Q-switch positioned in said closed path. Measurement of the return beam intensity is performed by a programmable controller connected to said means for detecting and programmed to output a control signal to said means for changing said closed pathlength.

When the controller determines that the measured return beam intensity is below the preselected threshold level, the slave laser is in phase with the seed laser, and single frequency pulses are being generated and emitted by the slave laser. Further adjusting of the mirror means which changes the pathlength of the closed path is not necessary unless the controller detects that the laser has shifted from this condition as indicated by the measured intensity slipping higher than the threshold level.

Figure 1:
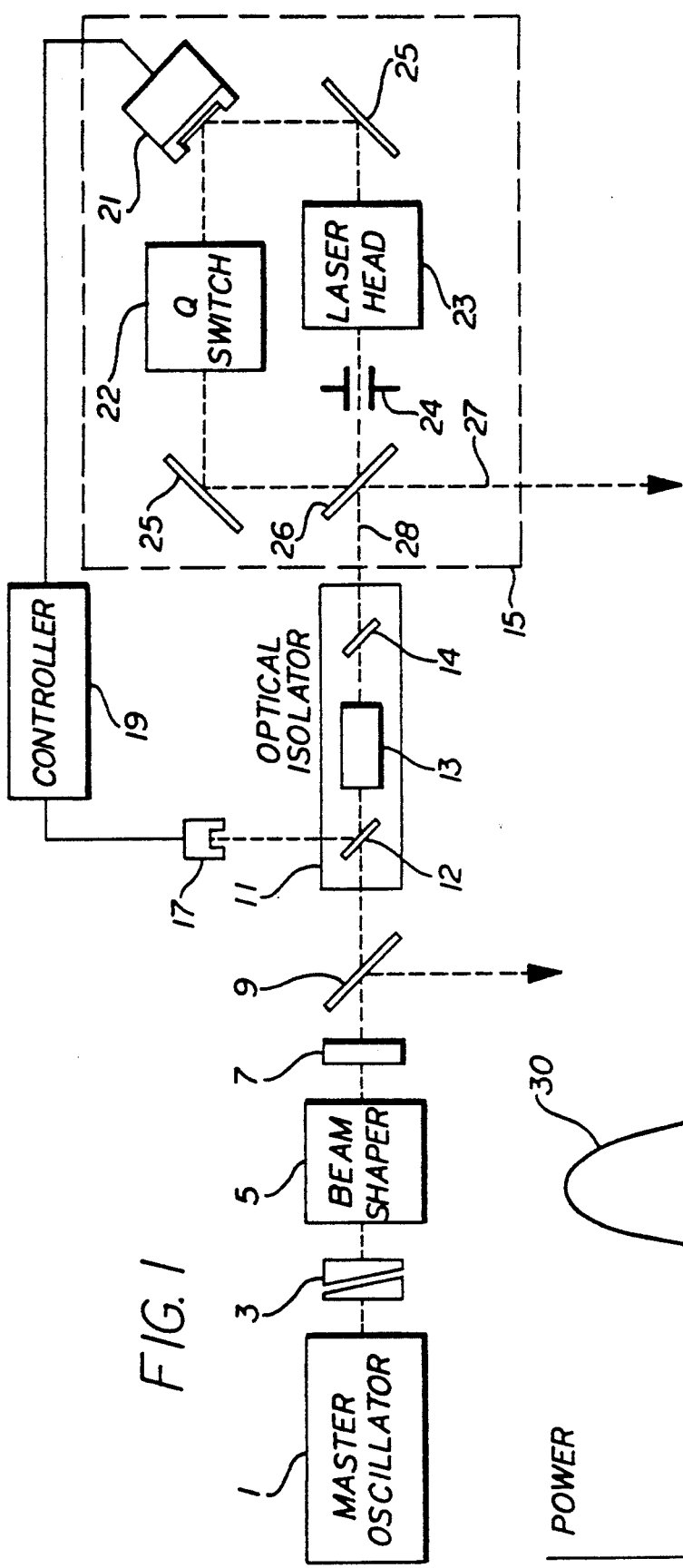
FIG. 1 shows a schematic diagram of the laser system comprising the seed laser and the slave laser circuits with a controllable corner mirror in the slave laser resonant path.

FIG. 1 shows the preferred embodiment used for this invention. Shown are a seed laser resonator 1, used as the master oscillator, a beam steerer assembly 3, a beam shaper 5, a half wave length wave plate 7, a Brewster polarizer 9, and an optical isolator 11. Optical isolator 11 contains a 45° Faraday rotator 13 sandwiched between an input Brewster window polarizer 12 and an output Brewster window polarizer 14 that have their principal planes at 45°. These components are aligned collinear with the lazing axis of seed laser 1 and their output enters into the ring slave oscillator 15. Optical isolator 11 serves to transmit the forward propagating seed laser light with very little attenuation while laser radiation emitted from the ring slave laser in a backward direction along path 28 is at 90° to Brewster polarizer 12 and is largely deflected.

The slave laser portion of the embodiment comprises the ring resonant cavity containing a flashlamp pumped Holmium laser head 23, corner mirrors 25 and 26, a Q-switch 22, an aperture 24, and a piezoelectric transducer with mounted mirror 21. Partially reflective mirror 26 allows transmission of the pulse output from the slave oscillator 15 along paths 27 and 28. Mirror 21 also serves as a corner mirror for the closed path and is adjustable under control of the piezoelectric transducer to make pathlength changes in the closed path.

When laser head 23 is fired by Q-switch 22, it normally emits laser radiation in both directions. The linearly polarized radiation directed back towards seed laser 1 along path 28, after passing through output Brewster window polarizer 14 and Faraday rotator 13, is reflected from Brewster window polarizer 12 to a detector 17. Detector 17 measures the intensity of the return beam and feeds this information to a controller 19. The controller then controls adjustment of corner mirror 21.

The master oscillator beam deflected by Brewster polarizer 9 can be used as a local oscillator beam for use in interferometric combination with output beam 27 after said output beam has interacted with a target medium located outside of the laser system.

Figure 2:
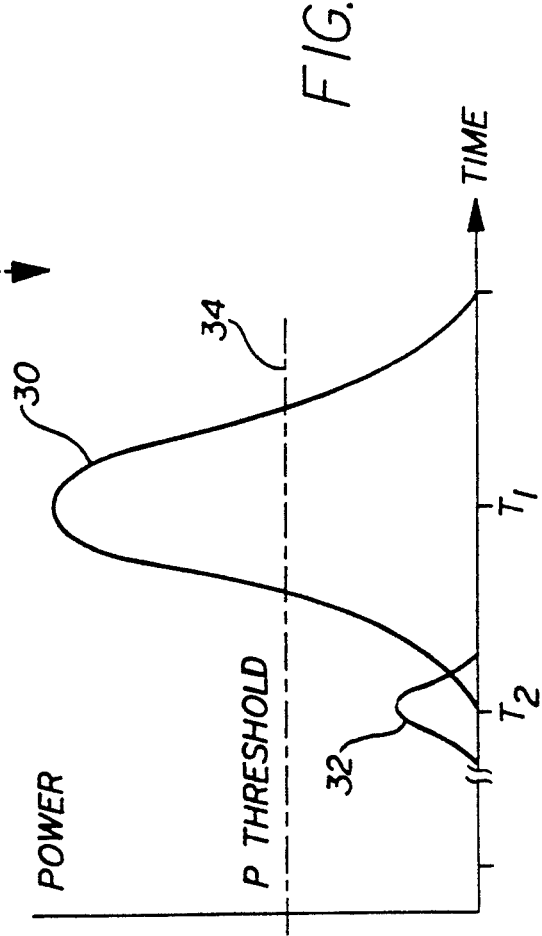
FIG. 2 shows the principle of the injection-seeding stabilization technique through the output of the detector in single and multimode SO operation.

FIG. 2 shows a plot of the power (or intensity) envelope for a laser pulse generated through slave laser 23 as received by detector 17 in an in-phase and an out-of-phase condition. The figure is a plot of the detector output power on the ordinate and time on the abscissa. A power threshold level has been indicated parallel to the abscissa by the dotted line identified as 34.

During operation, master oscillator 1 emits a low power single frequency signal. Its signal is directed into laser head 23 where it aids in establishing a limited frequency band for generation of a higher power laser pulse by the laser head 23 under control of Q-switch 22. Not shown, but part of laser head 23, is a flashlamp (or other source of excitation energy) and a laser rod for generating the desired high intensity pulse. Such elements are well known in the art.

Laser beam energy created by laser head 23 is emitted in both directions around the closed path. If the path is not balanced in-phase with the wavelength emitted by master oscillator 1, the intensity or power of the counter rotating laser beams are similar in level and are represented by curve 30 in FIG. 2. However, when the pathlength of the closed path loop is adjusted to be in-phase with the wavelength emitted by master oscillator 1, i.e., made to equal an integral number of the wavelength emitted by master oscillator 1, the return beam intensity drops considerably as compared with the beam moving forward (in a counter clockwise direction around the close path). The power and beam shape of such a return beam is shown as curve 32 in FIG. 2.

The difference in power levels between the return laser beam when out-of-phase with master oscillator 1 and when in-phase with master oscillator 1 is substantial and may be more than ten times in magnitude. By setting a threshold level 34 as shown in FIG. 2, it is relatively easy to detect when the system goes from an out-of-phase, unseeded operations to an in-phase, seeded operation by the dramatic change in the intensity of the return laser beam.

Therefore, in operating this system, as pulses are triggered to emit from laser head 23, detector 17 measures the intensity of the return beam and feeds this information to controller 19. While the intensity of the return beam is greater than the preselected threshold, controller 19 causes the corner mirror 21 to readjust itself after each pulse seeking a state where the intensity of the return beam drops below threshold level 34. The system can be programmed by one of any of several methods known in the art for searching for the in-phase condition. Once the in-phase condition is found, controller 19 continues to monitor detector 17 while it stops issuing adjustment commands between pulses to mirror 21. The system should now remain stable in an in-phase condition for generating and emitting high energy single frequency laser pulses along path 27.

Temperature and other environmental conditions may cause the pathlength of the closed path to shift out of an in-phase condition. This will be detected by an increase in the return beam intensity to a point above the threshold level. At this time detector 17, controller 19 and adjustable mirror 21 must re-engage their search procedures to again reestablish the in-phase condition.

A second preferred embodiment of the present invention incorporates further advantages offered by material covered in U.S. Pat. No. 5,099,486 by Achareker et al, which is incorporated herein by reference. In the Achareker et al patent a method and apparatus is presented where control of the frequency of pulses emitted by a resonant ring slave laser is forced to a single frequency defined by a master oscillator laser, also through the control of the pathlength of the ring laser resonant path. In this patent, Achareker et al monitored the time difference between turn-on of the Q-switch within the ring laser resonant cavity and the time of occurrence of the output pulse from the slave laser. By effecting changes to the ring laser resonant path through an adjustable corner mirror the time difference measured between the turn-on of the Q-switch and the output pulse from the slave laser could be minimized. When so minimized the frequency of the output pulse from the slave laser is driven to a single frequency as defined by the master oscillator.

Figure 3:
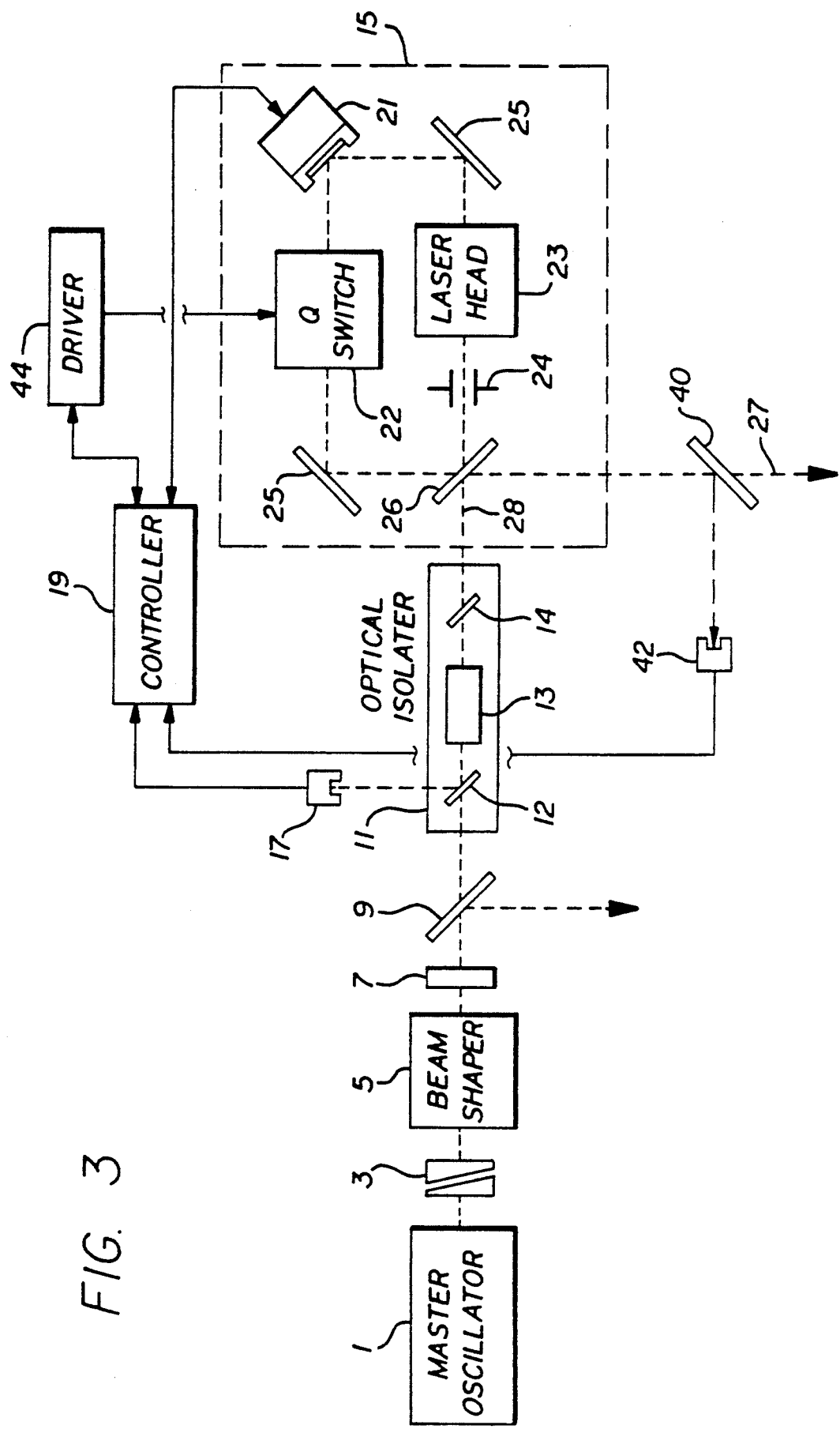
FIG. 3 shows the diagram of FIG. 1 further modified to include a prior art path length control circuit also included in the slave laser resonant path.

FIG. 3 shows the diagram of FIG. 1 modified to incorporate the additional capability offered in the Achareker et al patent. In addition to the components already described, a beam splitter 40 is shown intersecting the path of output pulse 27, a detector 42 is shown receiving part of the output beam, and the Q-switch driver 44 is shown connected to Q-switch 22 and to controller 19.

The advantage of this combination is that for initial rough location of the occurrence of the in-phase condition, the method of Achareker et al provides a more rapid procedure. Following identification of which direction to adjust mirror 21 to approach the in-phase condition by the Achareker et al method, completion of the search and mirror adjustment is more accurately and continually accomplished utilizing the specifics of the invention presented herein.

In FIG. 3, rough localization of a resonant in-phase condition for the closed cavity operation of the combined system is as follows. Part of output pulse 27 is deflected by beam splitter 40 to detector 42. Detector 42 feeds its signal to controller 19. Controller 19 is connected to monitor firing of Q-switch 22 through Q-switch driver 44. Therefore, controller 19 is capable of monitoring the time difference ($\Delta t$) between firing of Q-switch 22 and the output of the resultant pulse through beam splitter 40. Following each pulse cycle and the resultant measurement of the time difference ($\Delta t$) mirror 21 is adjusted slightly. Thereby, over a period of two or more measurement cycles of times $\Delta t$, the direction for mirror 21 adjustment in locating the in-phase condition of the closed cavity can be identified.

Continued measurement and control utilizing time difference measurements could continue, but preferably control would be turned over to the invention as presented herein. That control would then allow for more precise fine tuning for positioning mirror 21 to optimize the closed path to an in-phase condition and to deactivate the mirror 21 while the in-phase condition exists. If the novel method presented herein detects that the in-phase condition has been lost, then reacquisition may be implemented using either or both techniques once again.

The technique described in this invention is applicable to various types of solid state lasers including Thulium, Holmium:YLF (Tm,Ho:YLF), Thulium:YAG (Th:YAG), and Neodimium:YAG (Nd:YAG). The technique is also applicable to diode laser pumped lasers as well as flashlamp pumped lasers.

While this invention has been described with reference to its presently preferred embodiment its scope is not limited thereto. Rather such scope is only limited insofar as defined by the following set of claims and includes all equivalents thereof.

What is claimed is:

1. A single frequency laser system, wherein high energy pulse signals are generated and output at a single frequency as defined by a seed laser resonator in conjunction with a slave ring laser resonator, which comprises:

a seed laser resonator serving as a master oscillator;

a ring laser resonator serving as a slave laser connected to said seed laser, and having a closed path for its laser beam;

means for changing said closed pathlength of said ring laser resonator;

means, serving as part of said ring laser resonator, for switching into and out of resonance said ring laser resonator whereby said high energy output pulses are created;

means for detecting a return laser beam emitted from said slave laser back toward said seed laser resonator, and means for comparing the intensity of said return laser beam with a predetermined threshold level and for causing said means for changing to adjust said closed pathlength of said ring laser resonator by a predetermined amount before a next single output laser pulse is created in a manner present to be responsive to said compared intensity and said threshold level.

2. A single frequency laser system according to claim 1 wherein said ring laser resonator further comprises:

a plurality of mirrors for guiding a laser beam along said closed path containing a number of path legs equal to the number of mirrors;

a laser rod of a preselected lazing material for generating the high energy pulses and positioned in said closed path; and means for activating said laser rod which is connected to, and controlled by, said means for switching.

3. A single frequency laser system according to claim 2 wherein said means for switching comprises:

a Q-switch positioned in said closed path; and a Q-switch driver and connected between said Q-switch and said means for comparing.

4. A single frequency laser system according to claim 3 wherein said means for comparing intensities comprises:

a programmable controller connected to said means for detecting and programmed to output a control signal to said means for changing said closed pathlength.

5. A single frequency laser system according to claim 4 wherein said means for changing said closed pathlength comprises:

a piezoelectric transducer with a resonator mirror positioned as one of said plurality of mirrors, and connected to said programmable controller.

6. A single frequency laser system according to claim 4 wherein said means for changing said closed pathlength comprises:

an electrooptical transducer with a resonator mirror positioned as one of said plurality of mirrors, and connected to said programmable controller.

7. A single frequency laser system, wherein high energy pulse signals are generated and output at a single frequency as defined by a seed laser resonator in conjunction with a slave ring laser resonator, which comprises:
- a seed laser resonator serving as a master oscillator;
- a ring laser resonator serving as a slave laser connected to said seed laser, and having a closed path for its laser beam;
- means for changing said closed pathlength of said ring laser resonator;
- means, serving as part of said ring laser resonator, for switching into and out of resonance said ring laser resonator whereby said high energy output pulses are created;
- first means for detecting a return laser beam emitted from said slave laser back toward said seed laser resonator;
- second means for detecting said output laser pulse from said ring laser resonator and the time of occurrence of said output laser pulse;
- means for controlling which determines a time difference between said time of occurrence of said output laser pulse and the time said switching means switched into resonance said ring laser resonator whereby said output pulse was created, and compares the intensity of said return laser beam with a predetermined threshold level, said means for controlling outputting a signal to said means for changing for causing said means for changing to adjust said closed pathlength of said ring laser resonator by a predetermined amount before a next single output laser pulse is created, and in a manner to minimize said determined time difference or in a manner preset to be responsive to said compared intensity and said threshold level.

8. A single frequency laser system according to claim 7 wherein said ring laser resonator further comprises:
- a plurality of mirrors for guiding a laser beam along said closed path containing a number of path legs equal to the number of mirrors;
- a laser rod of a preselected material for generating the high energy pulses and positioned in said closed path; and
- means for activating said laser rod which is connected to, and controlled by, said means for switching.

9. A single frequency laser system according to claim 8 wherein said means for switching comprises:
- a Q-switch positioned in said closed path; and
- a Q-switch driver connected between said Q-switch and said means for controlling.

10. A single frequency laser system according to claim 9 wherein said means for controlling comprises:
- a programmable controller connected to receive signals from said first and second means for detecting and from said Q-switch driver, and programmed to output a control signal to said means for changing said closed pathlength.

11. A single frequency laser system according to claim 10 wherein said means for changing said closed pathlength comprises:
- a piezoelectric transducer with a resonator mirror positioned as one of said plurality of mirrors, and connected to said programmable controller.

12. A single frequency laser system according to claim 10 wherein said means for changing said closed pathlength comprises:
- an electrooptical transducer with a resonator mirror positioned as one of said plurality of mirrors, and connected to said programmable controller.

13. A method in a laser system, wherein high energy pulse signals are generated and output at a single frequency as defined by a seed laser resonator in conjunction with a slave ring laser resonator with an adjustable closed pathlength, which comprises the steps of:
- a) detecting a return laser beam emitted from said slave laser back toward said seed laser resonator
- b) measuring an intensity of said return laser beam;
- c) comparing said measured intensity with a preselected threshold level;
- d) adjusting said closed pathlength of said ring laser resonator by a predetermined amount in a manner preset to be responsive to said compared intensity and said threshold level, said adjustment to occur before a next single output laser pulse is created; and
- e) repeating the above steps until said measured intensity is less than said threshold level.

14. A method in a laser system, wherein high energy pulse signals are generated and output at a single frequency as defined by a seed laser resonator in conjunction with a slave ring laser resonator with an adjustable closed pathlength, which comprises the steps of:
- a) measuring a time $T_1$ at which said slave ring laser resonator is switched into resonance for the formation of a high energy pulse;
- b) measuring a time $T_2$ when said high energy pulse is emitted from said laser system;
- c) determining a time difference $T_2-T_1$;
- d) making a small predetermined change in said closed pathlength in a manner that tends to minimize $T_2-T_1$;
- e) detecting a return laser beam emitted from said slave laser back toward said seed laser resonator
- f) measuring an intensity of said return laser beam;
- g) comparing said measured intensity with a preselected threshold level;
- h) adjusting said closed pathlength of said ring laser resonator by a predetermined amount in a manner preset to be responsive to said compared intensity and said threshold level and in a direction to minimize $T_2-T_1$, said adjustment to occur before a next single output laser pulse is created; and
- i) repeating the above steps e) through h) until said measured intensity is less than said threshold level.

* * * * *